United States Patent [19]
Gancy

[11] Patent Number: 6,065,167
[45] Date of Patent: May 23, 2000

[54] FLUID-FILLED FLEXIBLE-WALLED CHAMBERS HAVING IMPROVED RESILIENCY, AND METHODS FOR CONTROLLING THEIR RESPONSE CHARACTERISTICS

[76] Inventor: Alan Brian Gancy, 3317 Meadowbriar La., Baldwinsville, N.Y. 13027

[21] Appl. No.: 08/925,512

[22] Filed: Sep. 8, 1997

[51] Int. Cl.[7] ............ A47C 27/08; A47C 27/10
[52] U.S. Cl. .................. 5/655.3; 5/706; 5/685; 5/710; 5/713
[58] Field of Search .......... 5/655.3, 654, 706, 5/713, 644, 665, 685

[56] References Cited

U.S. PATENT DOCUMENTS

| | | | |
|---|---|---|---|
| 2,360,715 | 10/1944 | Perry | 5/655.3 |
| 4,422,194 | 12/1983 | Viesturs et al. | 5/686 |
| 5,608,931 | 3/1997 | Gancy | 5/706 |
| 5,852,839 | 12/1998 | Gancy | 5/706 |

*Primary Examiner*—Alexander Grosz

[57] ABSTRACT

Fluid-filled, flexible-walled chambers in a variety of shapes are embraceably fitted with elastic loops or girths whereby the overall resiliency and cushioning ability of the chambers is improved. The expanded versatility of the resilient chambers makes possible improved designs of airbed and waterbed mattresses, and of toys, sports and safety equipment.

A method for controlling and improving the impact between automobile safety airbags and auto passengers is made possible through the incorporation of elastic girths in the design of the airbag.

11 Claims, 2 Drawing Sheets

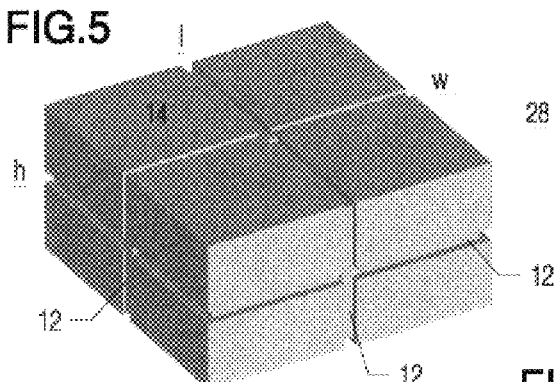
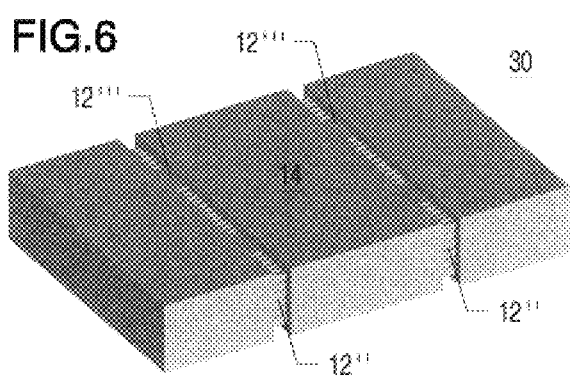
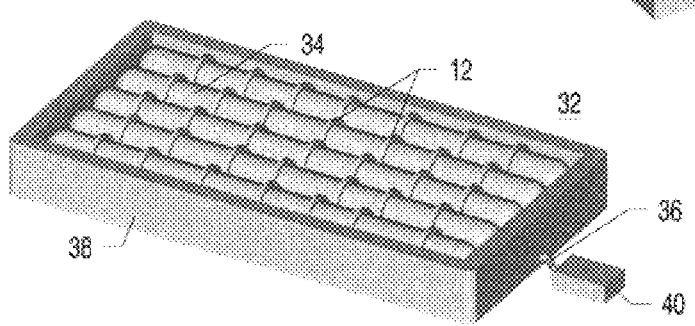
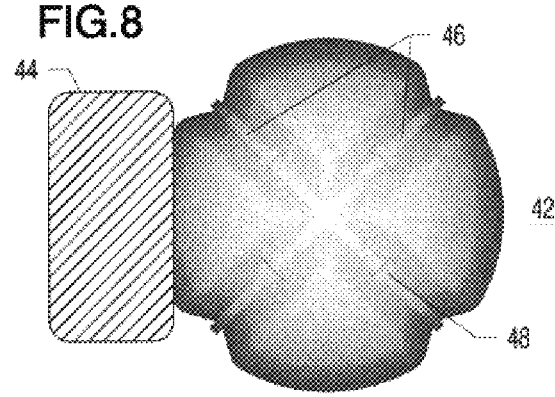

FLUID-FILLED FLEXIBLE-WALLED CHAMBERS HAVING IMPROVED RESILIENCY, AND METHODS FOR CONTROLLING THEIR RESPONSE CHARACTERISTICS

BACKGROUND OF THE INVENTION

The present invention relates to the improvement in the resiliency of response of inflatable flexible-walled chambers, and liquid-fillable flexible walled chambers whenever, under normal conditions of use, external pressure is applied to the chambers. Examples of such inflatable/fillable devices include air mattresses, air cushions, and waterbed mattresses. The novel principle is also applicable to the improvement in the response-action of the familiar automobile safety airbag.

In my previous teaching (U.S. Pat. No. 5,608,931) I described the use of internal springlike couplings which were attached at coupling ends to the interior walls of the airchamber. Each springlike, or elastic, member was characterized by a predetermined length in its fully extended, unstretched condition, and was elongated by the outward relative movement of the flexible chamber walls upon the application of inflationary pneumatic pressure. The elastic member was further elongated when an external mechanical force was applied to the chamber during normal use, e.g., the placement of the user's body onto the surface of an airmattress; it was during this latter stage of elongation when the improvement in the overall resiliency, or comfort, of the mattress was produced. Embodiments were covered wherein a multiplicity of such elastic members were employed, both as groups, and singly in spaced relationship along the interior walls of the airchamber. In said embodiments, some elastic members or couplings were different in length from others, some members were of differing strengths (moduli) from others, and wherein some members were of both differing lengths and moduli. The overall result of such embodiments was a further improvement in resiliency and comfort according to the enunciated "variable response" principle.

In my co-pending U.S. patent application Ser. No. (08/794,945) now U.S. Pat. No. 5,852,839 I teach the attachment of springlike couplings to the exterior walls of inflatable air chambers. This concept affords improvement in the ease of manufacture of such devices as airmattresses, as well as ease in inspection and replacement of worn or broken couplings. Furthermore, portions of the flexible walls means of the sealable, inflatable airchamber can themselves be fabricated from elastic material.

In all the foregoing embodiments, the flexible-walled airchambers are deformed at and near to the points of attachment of said couplings to said walls, when the device is in its inflated "rest" condition, e.g., before a person lies down upon the mattress. This deformation gives rise to the familiar "tufting" of the action-surface of the mattress whenever internal couplings are attached at their ends to the interior top and bottom walls of the chamber in spaced position along said walls. Then, upon application of said exterior mechanical force, this tufting tends towards a non-tufting "regular" surface both at points of application of said exterior force (beneath the person's body) and at all other points along the surface of the airchamber.

When elastic couplings are attached at their ends to the exterior surface of the flexible-walled airchamber, however, "tufting" as it is normally understood does not exist when the chamber is in its "rest position", i.e., inflated to a predetermined chamber pressure. Instead, a crimping of flexible wall material occurs, for example, between the two end-points of an elastic coupling where they are attached to said wall. Upon application of exterior mechanical force to the airchamber, this crimping tends to smooth out. Such crimping, as it occurs across the chamber surface whenever a multiplicity of elastic members is employed, follows a pattern that is dictated by the placement of elastic couplings across said surface.

It is the principle object of the present invention to provide an improved means of application of elastic control of the action surfaces of inflatable airchambers.

One object is to replace attached elastic couplings with continuous elastic bands, or metal or plastic springs, in a girth-like manner encompassing the airchamber.

Another object is to extend the applicability of the improved resiliency afforded by elastic bands, or springs, to a wide variety of airchamber shapes, and thus to a much wider range of airchamber uses.

Yet another object is to improve the ease of manufacture, inspection, and replacement of resiliently-acting airchambers by employing elastic means which embrace said airchambers without actually being attached to the surfaces of said chambers.

Another object is to employ girth-like elastic couplings to any and all exterior airchamber surfaces, so as to optimize the end-use viability of the device, including the so-called "action surfaces", e.g., the top of a seat cushion.

A further object of the present invention is to provide resiliency to the action of liquid-filled flexible-walled devices such as water mattress components.

Yet another object of the invention is to create an improved automobile safety airbag action response which will be gentler upon the auto passenger, through the design of the airbag which provides for elastic girth-like means to resiliently restrain the expansion of the airbag upon activation.

A further object of the invention is to create a novel type airbed which is simpler in design and manufacture than those heretofore available.

Perry (U.S. Pat. No. 2,360,715) has disclosed an inflatable rectangular-shaped seat cushion, " . . . the sides of which are constructed so as to be deformable and have cooperating therewith elastic means tending to urge the deformed portions to their normal positions.", i.e., once the user sits on the cushion. He also describes " . . . resilient means embracing and cooperating with all said side members [side walls of the seat cushion] for normally deforming said side members inwardly . . . ". Although he teaches application to a cushion " . . . in which a main, weight-bearing, air-inflated body is made of semi-elastic or non-elastic material . . . ", he does not specifically designate that the "resilient means embracing" must be more resilient than the "semi-elastic material" of the body of the device in order for the invention to be operable. Indeed, I teach that if the elastic modulus of the "resilient means embracing" is equal to or greater than that of the body of the cushion, at the point of application, then the device is not operable. Furthermore, he teaches " . . . it must be understood that the upper and lower surfaces of the cushion are provided with some means for holding them in definite relationship to each other . . . " Here he is referring to interior structural elements which give rise to the "tufting" mentioned earlier in this section. As will be seen in the more detailed discussion of my invention, such interior structural elements may be incorporated into the embodiments of my invention, but are totally optional. Indeed, regarding the spherical and tubular chambers of my invention, such internal structural members are superfluous.

Other objects will in part be obvious and will in part appear hereinafter.

SUMMARY OF THE INVENTION

In accordance with the foregoing objects, the invention contemplates a chamber having flexible wall means with surface portions relatively movable by application of an outwardly directed force, with elastic spring means embracing the chamber so as to oppose the outwardly directed force. Said force occurs in an inflatable chamber when the chamber is inflated to a predetermined level using air or other gas for the inflation. When the chamber is filled, or partially filled with water or other suitable fluid, the outwardly directed force is due to the weight of the water contained in the chamber. Just as in the case of an air- or gas-inflatable chamber, a predetermined amount of water or other liquid is introduced into the chamber. Normally, air is excluded in filling the water chamber, as in the case of a waterbed mattress. However, mixtures of gas and liquid may be used to fill the chambers of my invention. The spring means are disclosed in the form of rubber bands of the type industrially available. Alternatively, metal or plastic extension springs may be used as the spring means. Said spring means form a continuous loop which embraces the chamber.

The spring means in the case of a seat cushion, for example, is always in tension when the chamber is filled with air or liquid to a predetermined level. At that inflation level the chamber device is considered to be in its "rest" state. Once in use, e.g., when a person sits on the seat cushion, there is increased pressure on the device, which causes the wall means to move outwardly at all portions of the wall surface excepting the portion to which the external pressure is applied. The spring means embracing the device, already under tension, are further tensed as a consequence, and the spring means tends to resiliently oppose said outward movement of the walls. The result is increased comfort to the user.

In the "rest" state, the spring means are already tensed as they embrace the chamber device. This state is achieved by predetermining the circumference of said spring means when such means is in its fully extended, but yet unstretched state, i.e., before the elastic band is even applied to the chamber. Furthermore, the elastic modulus of the spring means is also carefully predetermined so that the desired end result will be achieved. For example, in the case of the seat cushion, the elastic modulus of the embracing spring means must be such that it provides a resilient response when persons possessing a range of body weights are destined to use said cushion.

In the current treatment, elastic modulus of rubber bands, for example, is determined by the nature of the rubber itself, and the cross-section of said bands. For a given type of rubber, the greater the cross-section of the rubber band, the greater the "strength" of the band, and the greater is its elastic modulus. In the simplest application, the elastic spring means consists of continuous rubber bands comprised of a suitable type of rubber, and having a predetermined length and cross-section. These bands form a continuous loop which can be placed embracingly about the chamber. Alternatively, the rubber is in the form of a strip which is placed around the chamber, then vulcanized at the strip ends to form a continuous loop while the chamber is in a deflated condition.

At least one such spring means is applied embracingly to the chamber device. When the device is a bed mattress—air or water—a multiplicity of elastic bands will be used in spaced relation over the external surface of the chamber.

In its rest state, the device will always be characterized by deformations of the flexible-walled chamber at the point of application of the embracing spring means, i.e., at points of contact between chamber walls and the embracing spring members. These deformations will not be uniformly distributed over the surface of the inflatable device excepting in the special cases in which the device is a sphere or a tube. For example, if the device were in the shape of a cube, a single embracing spring means would cause deformations at the 4 corner edges of the device. These deformations are visible as a crimping or wrinkling of the flexible wall means, depending upon just how flexible said means are. During use, when an external pressure is applied to the device, the crimping or wrinkling will tend to lessen, even in surface areas of the chamber at which said external pressure is applied. When the external pressure is removed, the device returns to its rest state and the wrinkling reappears more or less as it was prior to use.

Because the linear modulus of elasticity is fairly constant at all points around the spring means loop, the embracing force of the loop upon the device is linearly fairly uniform. Add to this the fact that the loop, being unattached to the wall means, is free to move circumferentially around the object. The net result is that all deformations of an inflatable chamber will tend towards a circular pattern at the points of application, regardless of the original shape of the device. Thus a square shape will tend towards that of a circle; an oblong shape will tend towards that of an oval, etc. Another way of expressing the concept is to say that the "corner edges" of any device which possesses them will tend to experience most of the crimping under the influence of the springlike embracing means, or girth.

Thus, crimping of the device will be experienced in a natural manner. No special construction of the inflatable/ fillable chamber need be incorporated in order to accommodate the crimping. For some applications, however, loops may be built into the flexible wall means to accommodate the exterior springlike girths so that they do not slide away from their predetermined positions at the exterior surface of the device during use, and especially if the device is frequently inflated, and deflated for storage or shipping spacesaving. Such loops would be made of flexible semi-elastic or essentially non-elastic material, most likely of the same material used to construct the wall means. Loops may be attached to the wall means as appropriate, e.g., by electronic welding, after the continuous elastic girth has been placed around the (partially or completely deflated) chamber in a predetermined position. Alternatively, the loops may be first permanently affixed to the exterior wall means, and then an elastic strip passed through the loops; the strip is then transformed into a girth by vulcanizing the ends of said strip together in place. Another attractive alternative is to fashion stationary loops so that they may be opened or closed at will, e.g., by using Velcro closures.

The flexible wall means of my invention consists of essentially semi-elastic material. One example is rubber- or nylon-impregnated fabric. Another is polyvinyl chloride (PVC) sheet. Another is polyurethane sheet. Another is soft molded PVC such as is used to construct toy soccer balls. Also, as in my co-pending application, elastic material such as fluid-impervious rubber sheet may comprise a portion of the flexible wall means. Thus it is important to designate that the resiliency of the elastic embracing means be greater than the resiliency of the wall means itself at the point of application, i.e., along the wall where the embracing means is in contact with said wall As defined here, even a semi-elastic chamber wall is less resilient than a stationery type rubber band. As soon as a rubber band is used whose modulus is so high that it becomes as "semi-elastic" as the wall means, then the invention is not operable. Strictly speaking, in order to compare resiliencies of wall means and embracing means, test samples of each would have to possess identical lengths and cross sections.

In order to better illustrate the point, assume that a given inflatable chamber is constructed of semi-elastic material. Now assume that a loop of embracing means is constructed of a sample of that semi-elastic material. Also assume that the embracing means is so sized that it causes the usual crimping of the chamber walls when the device is inflated to its "rest" state. Now, when external pressure is applied to the device by the user, the desired resilient relative expansion of the chamber at the point of application of the embracing means does not occur. On the contrary, at the point of application there now exists in effect a doubling of flexible wall thickness (as the device approaches full inflation), or a strengthening of the wall at that point. The wall becomes less resilient at that point, not more resilient as called for in my invention.

Stated strictly, the resiliency of the embracing means, over the range of the operation of the device, must be so selected that the combined action of the embracing means and the wall means at their point of contact provides a net increase in resiliency to the device over that of the wall means acting alone. Another way of expressing it is to say that the embracing means must result in an increase in resiliency of the device over what the device would provide without said embracing means. Yet another way of saying it is to designate that the rubber band (or the metal extension spring) not be "too strong" for the application. If the inflatable chamber wall means were made of non-elastic materials in the strictest sense, such definitions would be unnecessary.

Within the scope of my invention is the application of elastic loop girths to the circumference of an airmattress, i.e., touching top, bottom, and side walls. However, an extension of the concept is to apply elastic girths to a multiplicity of airtubes made of flexible walls, and placed side by side, either laterally or longitudinally, to comprise the body of the airbed. The tubes would be enclosed by perimeter walls comprised of dense foam material. A foam material pad would also be placed atop the tubes, i.e., so as to intervene between the tubes and the sleeper. The tubes are connected to flexible hoses leading to an airpump so that the user could increase or decrease air inflation pressure at will. Indeed, two pump outlets could be provided so that the tubes on "his" side of the mattress—in the case of longitudinally placed tubes—could be controlled independently from those on "her" side. In another embodiment of the invention, elastic girths around the airtubes are eliminated. The use of airtubes obviates the considerable manufacturing problem of building internal structural webbing into the (normally) rectangular airchamber comprising the mattress.

Indeed, the above tube design is already commercially available, but wherein water, not air, fills the flexible tubes. Within the scope of my invention, resilient embracing means are applied to the water tubes to increase their resiliency. Surprisingly, I have discovered that the use of such elastic girths, when properly applied, reduces the undesirable "wave action" so characteristic of waterbed chambers. Actually, waterchambers are less resilient in application than are airchambers because water, unlike air, is fairly incompressible and hence fairly non-elastic. When the sleeper lies on a waterbed, he displaces the water beneath his body to other volumes of the chamber. When he leaves the waterbed, water rushes back to fill the displacement void through the action of gravity. By the application of the elastic girths of my invention, waterbeds and other waterchambers for the first time will be characterized by a new kind of resiliency. Indeed, I define my invention as applied to "fluid-filled" chambers, where the term "fluid" designates not only air and other gases, but also water and other liquids. In some applications, a mixture of gases and liquids inside the chamber may be preferred.

The concept of the elastic girth may be applied to airchambers used as safety cushioning devices, both in static and in dynamic mode. For example, automobile passenger safety airbags are automatically activated and rapidly filled with gas whenever the vehicle experiences a collision impact exceeding a predetermined magnitude. The airbag is constructed of relatively inelastic material. The impact against the body of the seated passenger of the rapidly inflating airbag is so high as at times to be damaging and even fatal to the very passenger it is designed to protect. The impact of the body against the exploding airbag is akin to an impact against a solid wall. But an airbag made resilient by being externally and embracably fitted with elastic members considerably softens the impact without sacrificing the cushioning effect of the inflating bag. The bag, in its deflated condition prior to impact, is surroundably fitted with at least one, and preferably a plurality of elastic members which function to cushion the impact between bag and passenger. The elastic members may be anchored to the bag using stationary loops, as discussed above. Alternatively, the elastic girths may be anchored to a stationary portion of the airbag apparatus, i.e., to the hardware behind the airbag, which constitutes a stable base which normally contains the bag from behind.

As in its application to static airbags, the elastic girth acting on an auto safety airbag causes a wrinkling or a crimping in the bag in its useful inflated condition, i.e., in an underinflated state. Thus the elastic girth(s) convert a "hard", inelastic safety airbag into a resilient, elastic bag, which provides a softer cushioning protection of the passenger.

In order to incorporate an even greater resiliency into my fluid-filled chamber invention, I invoke the same "variable response" principle as enunciated in my airbag patent (U.S. Pat. No. 5,608,931). That is, I optionally replace single elastic loops with 2 or more such elastic loops in parallel whereby at least one loop is longer than the others, ceteris parabus. Also to achieve variable response, I optionally replace single elastic girths with 2 or more elastic girths working in parallel whereby at least one loop is characterised by an elastic modulus which differs from those of the others, ceteris parabus. Furthermore, I optionally replace a single elastic loop with at least 2 or more elastic loops working in parallel, and whereby individual loops differ both in length and in elastic modules. Obviously, a plurality of such parallel bundles of elastic girths can be applied to any given fluid-inflatable device.

Alternatively, to achieve variable response, I have placed a plurality of individual girths in spaced relation over the exterior surface of the fluid chamber, such that at least one such individual girth differs in length from all the others. Further, I have used a plurality of individual girths in spaced relation across the surface of the fluidchamber, such that at least one such individual girth differs in elastic modulus from all the others.

To achieve variable response I have also introduced the novel principle of the "segmented" elastic band, or embracing means, whereby elastic sections of the band are used in series with relatively inelastic sections. The consequent segmented band represents in essence a method of shortening the elastic band. Thus, when segmented bands are used in conjunction with and in spaced relation to regular, unsegmented bands, ceteris parabus, the result is a variable-response type of resiliency. Alternatively, a multiplicity of segmented bands may be used in spaced relationship to one another as distributed in a predetermined way across the surface of the fluidchamber, wherein the "elastic bands" sections of the segmented bands differ in aggregate length inter alia. This is, in essence, equivalent to using a multiplicity of single, regular elastic bands having different lengths.

A further variant is the parallel coupling of 2 or more segmented elastic bands as a "bundle", wherein at least one said band differs from the others with respect to its aggregate elastic section length. Such bundles may be employed as a multiplicity of groups in spaced relationship over the surface of the chamber. Obviously, the elastic moduli of the elastic sections of segmented bands can also be varied from one band to another, ceteris parabus, in order to achieve the variable response pattern of invention. Finally, elastic band lengths and elastic moduli may be both varied within the selfsame segmented band.

The advantage of the plurality of segmented bands over a plurality of single, regular bands of differing lengths is that the lengths of the segmented bands may be kept constant in their fully extended but unstretched states. In other words, the lengths of the elastic portions of the segmented bands are made to differ whereas the lengths of the segmented bands themselves can be made to be constant. Thus, a consequent constant "snugness of fit" of all of the plurality of bands embracing the fluidchamber.

The foregoing and other features of construction and operation of the invention will be more readily understood and fully appreciated from the following detailed description, taken in conjunction with the accompanying drawings.

BRIEF DESCRIPTION OF THE DRAWINGS

FIG. 5 is a rectangularly shaped inflatable/fillable chamber having flexible wall means, with 3 elastic girths positioned in 3 dimensions embracing said chamber in its partially inflated, or "rest" state.

FIG. 6 is a perspective view of an airmattress wherein the inflatable said mattress is embraced by a multiplicity of segmented elastic bands, and wherein two types of said bands are employed to produce a "variable" resilient response during use. Mattress is in "rest" state.

FIG. 7 is a perspective view of the inner workings of an air-inflatable, or water-fillable bed mattress comprising a multiplicity of longitudinally positioned inflatable/fillable tubes, each of said tubes being embraced by a multiplicity of elastic girths positioned in spaced relationship along the length of each said tube. Tubes are in partially inflated, or "rest" state in readiness for use.

FIG. 8 is a conceptual side elevation view of an automobile safety airbag in partially inflated state, wherein a multiplicity of elastic girths are employed embracably around said airbag in order to cushion the impact between airbag and passenger during activation of the airbag.

DETAILED DESCRIPTION

Figure 1:
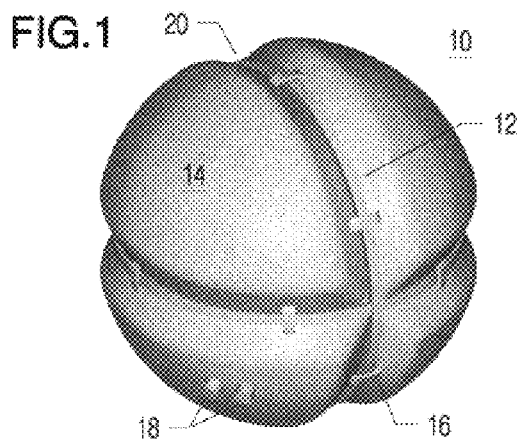
FIG. 1 is a view of a spherical inflatable/fillable chamber having flexible walls, with 2 elastic girths positioned embracably about said chamber. Chamber is in "rest" state.

Referring to the drawings, FIG. 1 shows a spherically-shaped inflatable device, 10, with two elastic girths, 12, positioned embracably about external wall, 14, of said device. A multiplicity of loops, 16, are positioned so as to keep the elastic girths from moving away from predetermined positions, using suitable means of attachment of said loops to said external wall. Two valves for inflation/deflation of the device are shown as 18. Slight deformations of the device resulting from partial inflation to the "rest" state are indicated by 20. I constructed such a device using a toy soccer ball made of soft, moldable PVC, and stout rubber bands as the elastic means. When the device was air-inflated and dropped from a predetermined height onto a hard floor, the "bounce" pattern was noted. It was observed that incorporation of the elastic bands caused the ball to "bounce higher". The ball was then filled with water through one valve, using a second valve for the escape of air. The "bounce" of the water-filled ball was higher when the elastic girths were employed than when they were not. The invention therefore has application to toys, sports, and other devices.

Figure 2:
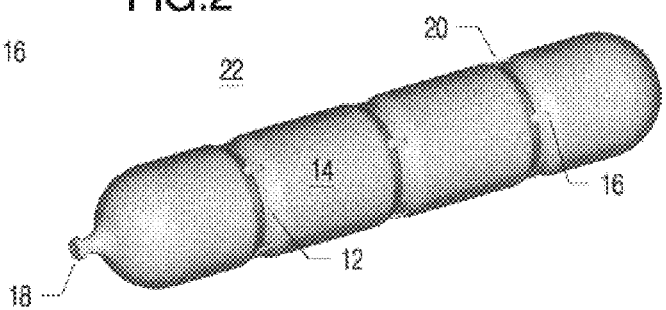
FIG. 2 is a view of an inflatable/fillable tubular chamber having flexible walls, with a multiplicity of elastic girths positioned in spaced relation along the longitudinal dimension of said chamber. Chamber is in "rest" state.

FIG. 2 shows a tubular, flexible-walled chamber, 22 which is completely sealed in construction so as to hold air or water under a reasonable end-use pressure, without leaking. Filling/inflation port is indicated as 18. Elastic girths, 12, embrace chamber walls 14. Deformations of the device are indicated in the drawing by 20. Loops, 16, keep the elastic girths from moving in a longitudinal sense along the surface of the tube as a result of inflation/deflation and use. Elastic girths, however, are unattached, and hence free to move in a circumferential sense. I constructed such a device using a tube made of PVC sheet, and stout rubber bands. The response of the tube to externally applied mechanical force or pressure was much more resilient than that of the unembraced tube. This was also found to be so, when the tube was filled with water. An unexpected finding was that the well-known undesirable "wave" action of the water within these devices—activated by applying a periodic pressure pulse to one end of the tube—was dampened by the presence of the elastic girths. The invention works with partially air-inflated or partially water-filled tubes. For testing purposes, the tube was filled with various amounts of water, each time to the virtual exclusion of air. The circumferences of the applied elastic girths were adjusted, as required, depending upon the required degree of filling of the tube, with air or with water, to produce a desired "rest" state of the tube. Tubes of this invention have application in air- and waterbeds. A tube as I define it for purposes of this invention need not be circular in cross section, but can be "square" (with or without rounded corners) or the like.

Figure 3:
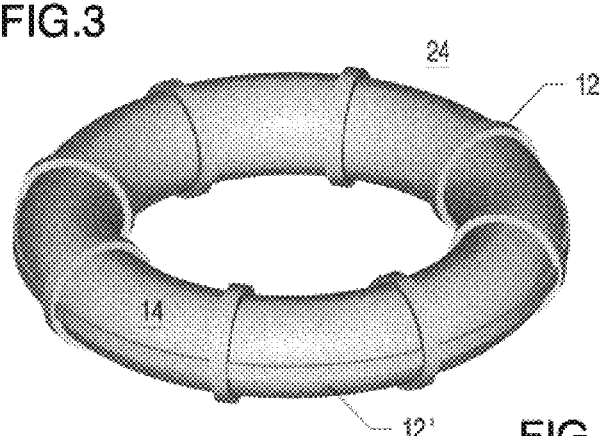
FIG. 3 is a view of a "continuous tubular" (inner-tube design) inflatable/fillable chamber having flexible wall means, with a multiplicity of elastic girths placed in spaced relation along the "length" of the tube. The figure also shows a single elastic girth embracing the outer circumference of the tube. Chamber is in "rest" state.

FIG. 3 shows an "inner-tube" shaped inflatable chamber having flexible walls means, 24. One positioning of elastic girths, 12, is shown embracing the tube along its "length". Another type of positioning is shown by the circumferentially and embracingly applied girth 12'. Valves, deformations, and loops are not shown. Flexible wall exterior is designated as 14. Such devices will have application as medical cushions and other devices.

Figure 4:
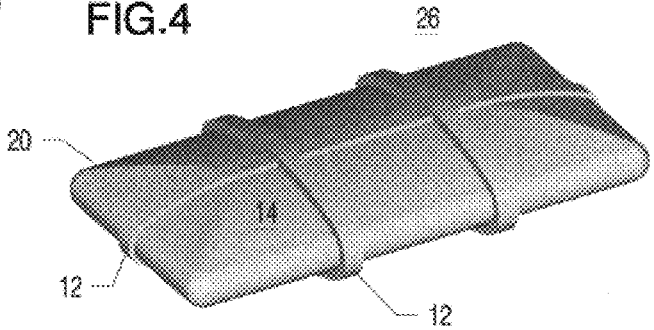
FIG. 4 shows a "side-less" inflatable/fillable chamber having flexible wall means, whereby the chamber has a rectangular shape in plan view, and employs 2 elastic girths positioned embraceably about said chamber, and wherein said girths are positioned perpendicular to one another. Chamber is in partially inflated, or "rest" state, in readiness for use.

FIG. 4 shows a "side-less" inflatable/fillable flexible-walled chamber, 26 which is outfitted with elastic girths, 12, which act as constraints upon the flexible walls 14. Whereas a multiplicity of such girths can be configured in different ways depending on the end-use application of the device, FIG. 4 shows 2 girths in one circumferential position, and a third girth placed at right angles to the aforesaid 2. Filling valves and restraining loops are used, but not shown in the figure. I have constructed such a device designed to be filled with air, and used as a bedpillow. Like a standard bedpillow, the plan view shape of the device is rectangular in the figure. Such devices are sealed at least at the outer edges 26 in order to hold air or other gases, or liquids including water, at a reasonable in-use pressure without leaking. There is no restriction on the plan view shape of such side-less chambers. Wall deformations, though present, are not shown in the figure, where the device is depicted to be in its user-ready, or "rest" state.

FIG. 5 depicts a rectangular-shaped inflatable/fillable flexible-walled chamber useful as a bedmattress, seatcushion, or other device, 28. The figure is l units in length, w units in width, and h units in height. Although a multiplicity of elastic girths, 12, can be used to embrace said chamber, and placed in a variety of configurations, the figure shows only 3 such girths, each embracing one of the three circumferences of the device. The exterior walls of the device are labeled as 14. All three of the following sets of relative dimensions apply to this rectangular chamber invention:

$$l = w = h \text{ (cube)}$$

$$l \neq w = h \text{ (two square sides)}$$

$$\{l \neq w \neq h\} \searrow$$

(All 3 pairs of sides unequal)

$$\{l \neq h \quad \} \nearrow$$

Whereas none of the chamber-like devices of the present invention mandate the use of internal structural members such as inelastic webbing, springs, rubber bands and the like in order to hold various wall surfaces "in definite relation to each other", such internal supports may be used in order that the device somewhat hold its original relative shape upon inflation in some instances.

In FIG. 5, inflation/deflation valves or ports, and guide loops are not shown.

FIG. 6 depicts a rectangular flexible-walled inflatable/fillable chamber, 30, equipped with segmented elastic girths which act embraceably on the partially inflated chamber. Segmented girths are constructed of relatively elastic, and relatively inelastic segments, or strips, acting in series. In the figure only two such segmented girths are shown for simplicity's sake. Whereas both possess the same fully extended but unstretched length (or circumference), one segmented girth has a greater proportion of elastic segments than the other. Thus, the "open" areas 12''' represent resilient segments, the "filled" areas 12'''' represent the relatively inelastic portions. Such a device provides the "variable" resilient in-use response described elsewhere in this document. Note that a segmented loop, or girth, need consist of only 2 segments—one elastic, and one relatively inelastic (semi-elastic)—to be effective. A multiplicity of relatively elastic and relatively inelastic segments may also be alternated within the total girth, as shown in the figure. Such segmented embracing means produce local deformations (not shown) in the walls, 14, of the device. Also not shown are the inflation/filling port, and the restraining girth-guides. Elastic and inelastic strips are joined end-to-end to form the segmented girths using suitable joining means, such as electronic welding, or thermal welding.

In FIG. 7 a novel type air- or waterbed mattress is shown in perspective view. The essence of the new design is the multiplicity of air- or watertubes laid side by side in tightly packed configuration when the tubes are in their "rest", or readiness state. Whereas tubes may be packed laterally or longitudinally, only the latter are shown in the figure. As stated earlier, such a design employing watertubes without the elastic girths embracably positioned along the lengths of said tubes is already available commercially. It is the elastic girths which comprise the vital improvement in the present waterbed invention. Also, as far as I am aware, the airtube design—with or without embracing means comprised of elastic loops—is completely novel. Thus, in the figure, 32 depicts the device without its top layer of foam material, and its enclosing flexible, zippered cover. The cover is constructed of suitable flexible material or fabric, a six-sided rectangular enclosure with zipper or zippers around the perimeter walls which allow for easy assembly/dissembly of the entire device. The bottom of said cover forms the "floor" of the mattress. Directly over the floor may be a snug-fitting foam pad 1" to 2" thick to act as a cushion between said floor and the inflatable/fillable tubes 34. In the figure five such tubes are shown, but for larger, so-called queen-size or king-size beds there may be an even number of tubes longitudinally placed, as in the figure. Thus, one-half of the airtubes are connected to one outlet of an airpump through connecting flexible airhoses, and the other half of the tubes are likewise connected to a second outlet of the selfsame airpump. In this way there is afforded a "his" and a "hers" control of airtube inflation/deflation so as to accommodate the comfort needs of each individual.

Individual airtubes may be outfitted, at one end, with a flexible airhose which is in turn connected by suitable joining means to a flexible manifold airtube. The latter, in turn, is connected to an airpump located externally to the mattress. The airpump is capable of air-inflation or deflation at the touch of an electrical control button placed conveniently to the user. In the figure device a manifold airhose is in turn connected to each of the 5 airtubes, at one end of the tubes (not shown). The manifold flexible tubing, configured in a position lateral to the tubes, is in turn connected through a single flexible hose, 36, which passes through an opening the foam perimeter, 38, to the electric airpump 40. In this case all 5 tubes are inflated at once, or deflated at once.

In storing or shipping the device, couplings are used conveniently for each of the 5 flexible airhoses leading to said manifold so that the tubes may be disconnected for easy removal from the rest of the mattress components, and so that they may be completed deflated and folded to a minimum volume. In re-assembling the airtube device, re-connection of the airhoses through said couplings is easily accomplished. Couplings are not shown in the figure. Likewise, flexible hose 36 may be coupled/decoupled using suitable coupling means.

Individual elastic girths, 12, embrace each airtube, or watertube, as shown in the figure. The girths in the figure are placed in the same spatial relationship along tube lengths for each tube, but girths may be in staggered relationship, tube to tube. Restraining loops are not shown.

In the case of the waterbed, there are no hoses connecting tubes to the mattress exterior, to a "waterpump", for example, in the articles of commerce available currently. However, such a device is conceivable. I therefore designate that, in the case of water-filled tubes as opposed to airtubes, the electric pump 40 is capable of "filling" and "emptying" the watertubes at the control of the user at the press of a button. Thus is afforded a "firmer" or a "softer" waterbed "feel" according to the amount of water contained in the watertubes, in perfect analogy with airtubes of the airmattress.

When waterbeds are used without benefit of waterpumps, the flexible-walled tubes 34 are individually filled with water to a predetermined mark on the translucent tube. It is advisable that all tubes of an individual bed be filled to the same predetermined mark. Furthermore, care must be taken that, under normal recommendations, no air be allowed to accompany the water within the tube. However, for the purposes of the present invention, no restriction is placed upon the relative amounts of water and air inside the tubes.

The firm foam perimeter 38 may be formed of 4 or more individual foam sections held together by suitable attachment means, e.g., Velcro. If compactness in storage and shipping of the mattress is not a consideration, the foam perimeter 38 may be composed of a single molded piece. Indeed the foam "floor" and perimeter walls may all be molded as one piece.

Not shown in FIG. 7 is a single foam material "topper" which sits atop the tubes 34, and fits snugly within the perimeter 38. The topper is normally constructed of a softer, more resilient foam than is used for perimeter walls and floor. Also not shown is the 6-sided completely enveloping zippered cover which encases the mattress. The user surface of such covers is normally constructed of soft quilted or tufted material for the better comfort of the user. The topper and the foam perimeter form a single flush surface.

The advantage of the elastic girth feature of the present invention, as applied to watertubes, is a resiliency of said tubes in response to the weight and movement of the user, i.e., the sleeper, which has hitherto been unknown. Hence a much improved comfort for the sleeper. Further, the well known onerous feature of "wave action" within the waterchambers of waterbeds is reduced, and may be conceivably eliminated by the action of the elastic girths. Finally, the transformation of a conventional waterbed to the one of the present invention—through the application of elastic girths—is eminently economical. Thus, readily available industrial type rubber bands may be slipped over the ends of the conventional tubes, positioned along the lengths of the tubes, then held in place by suitable restraining means. The girths remain in the desired spaced relationship during assembly/dissembly, and use.

The obvious single advantage of the airtube mattress of the present conception is its light weight. Another advantage is the ease of manufacturing airtubes requiring no inner structural members, as opposed to airbeds currently in manufacture. A further advantage of the invention is the increased resiliency afforded by application of elastic girths, as opposed to tubes not so outfitted. As in the case of watertubes, conversion of airtubes through the application of elastic girths is eminently economical.

FIG. 8 depicts a further application of the airbag which is embracably outfitted with elastic girths so as to result in greater resilient response to an externally applied force, in this case the force of an automobile passenger impacting a partially inflated bag. The figure shows a partially inflated bag, 42, just milliseconds subsequent to its activation by an internal gas-release mechanism. As in all applications of the invention the chamber, in this case the airbag, becomes deformed at the points of contact between the airbag and the externally embracing elastic girths. Thus the airbag, upon activation, proceeds to inflate, then proceeds to the deformed configuration, and finally proceeds to full inflation. The airbag is in resilient contact with the passenger during its deformed state condition. This, in effect, provides greater cushioning of the passenger by the airbag, with less risk of injury.

The base of the airbag device is symbolically represented by 44 in the figure. Both the airbag and the embracing elastic girths are anchored to the base. Alternatively, the elastic girths need not be anchored to the base, but simply held to the surface of the airbag, both in the collapsed and the inflated state, by means of guide loops attached to the bag. Note that the deformations in the bag surface during partial inflation may be located anywhere on the bag surface in order to provide resilience and cushioning at the area of impact between bag and passenger, and need not be located at said area.

In FIG. 8 elastic girths 46 are held in position at the bag surface, whether in deflated or inflated state, by means of the guideloops 48. This is only one of a number of conceivable configurations, but the principle is the same: greater cushioning by the auto-safety airbag is afforded by resilient means embracing the bag during its activated inflation. In the figure, the right-hand portion of the airbag impacts the passenger (not shown). Also not shown is the deformation of the right-hand portion of the bag due to the impact with the passenger. Thus, during inflation, the surface of the bag "impacts" the resilient girths as well as the passenger.

The guideloops, 48, prevent the lateral movement of the girths, away from their predetermined positions, but do not restrict any circumferential movement of the unattached girths, which may occur during bag activation. The use of elastic girths represents an economical means of transforming an otherwise potentially injurious bag action to one of gentler cushioning.

During manufacture, the elastic girths are positioned, and secured to the inflated auto safety airbag in a predetermined configuration. The bag is then deflated and compacted into the base, ready for emergency activation.

I claim:

1. In an inflatable device having flexible wall means forming at least a portion of a fluid-impervious chamber, said wall means being outwardly movable over a predetermined range of movement in response to pressure applied by a contained fluid uniformly over the internal surface of said chamber, means resiliently opposing said outward movement over at least a portion of said range of movement, said resiliently opposing means comprising a plurality of spring-like or elastic loop or girth members in spaced relation across the exterior surface of said chamber, wherein the resiliency of the chamber in response to an externally applied force against said chamber is increased by the application of said spring-like members.

2. The invention according to claim 1 wherein said fluid is air or other gas.

3. The invention according to claim 2 wherein said chamber is a component of an airmattress.

4. The invention according to claim 3 wherein said chamber is outfitted with flexible tubing means of communicating with an exteriorly positioned airpump for inflation/deflation adjustment of internal chamber air pressure.

5. The invention according to claim 1 wherein each said member has a predetermined, fully extended, unstretched length or circumference.

6. The invention according to claim 1 wherein at least one of said elastic loop members has an elastic strength different from the elastic strength of another of said loop members.

7. The invention according to claim 1 wherein at least one of said elastic loop members has a fully extended, unstretched length different from the fully extended, unstretched length of another of said elastic loop members.

8. The invention of claim 1 wherein said spring-like means are restricted in terms of lateral movement relative to predetermined positions of said spring-like means at said chamber exterior wall by guide means fixedly attached to said chamber exterior wall.

9. The invention of claim 1 wherein said fluid is water or other liquid.

10. The invention of claim 9 wherein said chamber is a component of a waterbed mattress.

11. In an inflatable device having flexible wall means forming at least a portion of a fluid-impervious chamber, said wall means being outwardly movable over a predetermined range of movement in response to pressure applied by a contained fluid uniformly over the internal surface of said chamber, means resiliently opposing said outward movement over at least a portion of said range of movement, said resiliently opposing means comprising a plurality of segmented bands, and wherein the resiliency of one of said segmented bands is different from the resiliency of another of said segmented bands.

* * * * *